(12) United States Patent
Morris

(10) Patent No.: US 7,500,722 B2
(45) Date of Patent: Mar. 10, 2009

(54) SEAT BELT SYSTEM

(76) Inventor: Alvan M. Morris, 4550 N. Park Ave., Apt. 510, Chevy Chase, MD (US) 20815

( * ) Notice: Subject to any disclaimer, the term of this patent is extended or adjusted under 35 U.S.C. 154(b) by 0 days.

(21) Appl. No.: 11/837,566

(22) Filed: Aug. 13, 2007

(65) Prior Publication Data

US 2008/0191540 A1   Aug. 14, 2008

Related U.S. Application Data

(60) Provisional application No. 60/861,735, filed on Nov. 30, 2006.

(51) Int. Cl.
*B60R 22/00* (2006.01)
*B60R 21/00* (2006.01)

(52) U.S. Cl. .................. 297/483; 297/232; 297/248; 297/468

(58) Field of Classification Search .......... 297/483, 297/468, 232, 248
See application file for complete search history.

(56) References Cited

U.S. PATENT DOCUMENTS

| | | | | |
|---|---|---|---|---|
| 4,592,592 A * | 6/1986 | Peek | ........................ | 297/483 |
| 4,973,083 A * | 11/1990 | Richards et al. | ......... | 297/483 X |
| 5,380,067 A * | 1/1995 | Turvill et al. | ............... | 297/484 |
| 5,845,967 A * | 12/1998 | Kane et al. | ................ | 297/250.1 |
| 6,123,388 A * | 9/2000 | Vits et al. | ............... | 297/483 X |
| 6,145,881 A * | 11/2000 | Miller et al. | ................ | 280/806 |
| 6,250,680 B1 * | 6/2001 | Moker | .................... | 297/483 X |
| 6,312,056 B1 * | 11/2001 | Murphy et al. | .......... | 297/483 X |
| 6,328,386 B1 * | 12/2001 | Good | ......................... | 297/483 |
| 6,485,098 B1 * | 11/2002 | Vits et al. | ............... | 297/483 X |
| 6,508,515 B2 * | 1/2003 | Vits et al. | .................... | 297/483 |
| 6,666,520 B2 * | 12/2003 | Murphy et al. | .............. | 297/483 |
| 6,676,219 B1 * | 1/2004 | Brewer | .................... | 297/483 X |
| 6,886,889 B2 * | 5/2005 | Vits et al. | ............. | 297/452.18 |
| 6,938,959 B1 * | 9/2005 | Borunda et al. | ............. | 297/483 |
| 7,055,901 B2 * | 6/2006 | Graham et al. | .......... | 297/483 X |
| 7,063,389 B2 * | 6/2006 | Kennedy, Sr. | ............... | 297/483 |
| 7,156,469 B2 * | 1/2007 | Kennedy, Sr. | ............... | 297/483 |
| 7,226,131 B2 * | 6/2007 | Meneses et al. | ......... | 297/483 X |

* cited by examiner

*Primary Examiner*—Rodney B. White
(74) *Attorney, Agent, or Firm*—Lowe Hauptman Ham & Berner LLP

(57) ABSTRACT

A seatbelt system enables substantially different sized vehicle occupants (for example an elementary school student and a high school student) to occupy the same seat location having a horizontal base on which the different occupants can sit. First and second 3-point restraining systems, respectively including first and second guides at first and second different fixed heights above the horizontal base, at the seat location enable the different sized occupants to be safely and comfortably restrained at the seat location at different times.

17 Claims, 4 Drawing Sheets

SEAT BELT SYSTEM

CROSS-REFERENCE TO RELATED APPLICATION

The present application is a continuation in part of my provisional application entitled SCHOOL BUS SEAT BELTS, Ser. No. 60/861,735, filed Nov. 30, 2006.

FIELD OF INVENTION

The present invention relates generally to seatbelt systems and, more particularly, to a seatbelt system including first and second vehicle occupant restraining systems for a single seat location of a vehicle, wherein the first and second restraining systems respectively include first and second belt guides at first and second different fixed heights above a horizontal base on which the different sized occupants sit so that the restraining systems enable vehicle occupants of substantially different sizes to safely and comfortably occupy the single seat location at different times.

BACKGROUND ART

A typical 3-point vehicle seatbelt restraining system includes, at each seat location of an automotive vehicle having a horizontal seat base on which an adult sized vehicle occupant sits, a belt (i.e., web), a buckle mounted on a first side of the seat location and a guide through which the belt passes. The guide is typically a fixedly mounted, pivotable plate having a slot through which the belt passes or a fixedly mounted idler roller the belt traverses. The belt has first and second ends respectively connected to (1) an anchor fixedly mounted below the guide, and (2) a retractor fixedly mounted below the guide. In use, the belt is wound and paid from the retractor. The anchor and retractor are mounted at or in proximity to the same, second side of the seat location that is opposite to the first side of the seat location. The restraining system also includes a tongue slidably connected to the belt between the guide and anchor for connection to the buckle. The guide is mounted at or in proximity to the second side of the seat location at a height above the horizontal base of the seat location. In many systems, the height of the guide above the horizontal base of the seat location is adjustable to enable a typical adult sized occupant of the seat location to be safely and comfortably restrained on the seat base at the seat location while the tongue is connected to the buckle. The belt, when in use with the tongue in the buckle, includes (1) a first segment between the retractor and the guide, (2) a second segment between the guide and the tongue for restraining the shoulder and chest of the adult occupant, and (3) a third segment between the tongue and the anchor arrangement for restraining the lap of the adult sized occupant.

Three point seatbelt systems of the above type, however, have not proven satisfactory for vehicle occupants who are not adult sized. It is mandated in most states of the United States that children under a certain size must sit in a booster seat that is held in place by three point seat belt systems of the above type. Such booster seat arrangements are expensive and difficult for many childcare givers to install and remove. The installation and removal process is particularly highlighted in families using more than one automotive vehicle to transport children and who do not have sufficient funds to purchase a booster seat for each automotive vehicle.

The problem is also acute in school buses for transporting children of different sizes and ages. In fact, the use of seatbelts for student transportation has become highly controversial. While some states of the United States have currently made some form of seatbelts mandatory for school buses, most states have not installed school bus seat belt systems because the National Highway Traffic Safety Administration (NHTSA) and the National Academy of Science (NAS) have stated that three point belts on school buses would provide little if any added protection in a crash. The findings of these agencies are understandable because those states which have installed seat belts on school buses use only lap belts that do not employ a belt guide or a retractor. Lap belts do not prevent the upper torso of an individual from being thrown forward if the school bus were involved in a front end collision or a bus roll-over. Hence, lap belts can create more of a hazard to the passenger of a school bus in an accident situation than no belt at all. In contrast, the three point seat belt systems do prevent the upper torso of an individual from being thrown forward if the vehicle were involved in a front end collision or a roll-over.

A major problem with attempting to place three point seat belt restraining systems in family automotive vehicles, as well as school buses, is that the same seat location is occupied by adult or near adult sized vehicle occupants as well as young children, who are obviously much smaller than the adult sized or near adult sized occupants. For example, the same school buses transport both young children (five-ten year old elementary students), and older and larger students, such as those attending middle and senior high schools.

The standard placement of the guide above the seat belt of the three point systems provides proper and adequate chest and lap position for the larger children, but creates a safety issue for the younger, small children, in both school buses and family automotive vehicles. The segment of the belt between the guide and the tongue for restraining the shoulder and chest of the occupant of the seat location is such that this portion of the belt is in front of or intersects the neck of the smaller children. If the small child were thrown suddenly forward in any type of accident involving the family automotive vehicle in which the child is riding or a school bus, there is a significant possibility of the child being choked or strangled by the belt. Consequently, three point safety belts are not used for small children in family automotive vehicles or school buses.

Another reason for not using the prior art three point seat belt systems on school buses is that the buses frequently are arranged so that three students sit on each school bus bench. In such an instance, the belts must be retrofitted to the school bus to maintain the desired total seating capacity of the bus.

It is, accordingly, an object of the present invention to provide a new and improved seatbelt system of the three point type, wherein the seat belt system can, at each seat location, be safely and comfortably used for seat occupants of different ages at different times.

SUMMARY OF THE INVENTION

In accordance with a first aspect of the invention, a seatbelt system enables substantially different sized vehicle occupants to occupy the same seat location having a horizontal base on which the different occupants can sit. The seatbelt system comprises: first and second three-point restraining systems for enabling the different sized occupants to be safely and comfortably restrained at the seat location at different times. The first and second restraining systems respectively include first and second belt guides at first and second different fixed heights above the horizontal base.

In accordance with a second aspect of the invention, a seatbelt system enables vehicle occupants of substantially different sizes to occupy the same single seat location of a motorized vehicle, wherein the seat location has a horizontal seat base on which the different sized vehicle occupants can sit at different times. The seatbelt system comprises a buckle mounted on a first side of the seat location and first and second vehicle occupant restraining systems for the seat location. The first restraining system includes: a first belt and a first guide through which the first belt passes. The first belt has first and second ends respectively connected to (1) an anchor arrangement fixedly mounted below the first guide, and (2) a first retractor fixedly mounted below the first guide. The anchor arrangement and first retractor are mounted at or in proximity to the same, second side of the seat location that is opposite to the first side of the seat location. The first restraining system also includes a first tongue slidably connected to the belt between the first guide and the anchor arrangement for connection to the buckle. The first guide is mounted at or in proximity to the second side of the seat location at a first fixed height above the horizontal base of the seat location such that a relatively tall occupant of the seat location is safely and comfortably restrained on the seat base at the seat location while the first tongue is connected to the buckle. The first belt, when in use with the first tongue in the buckle, includes (1) a first segment between the first retractor and the first guide, (2) a second segment between the first guide and the first tongue for restraining the shoulder and chest of the tall occupant, and (3) a third segment between the first tongue and the anchor arrangement for restraining the lap of the tall occupant. The second vehicle occupant restraining system for the seat location includes: a second belt and a second guide through which the second belt passes. The second belt has first and second ends respectively connected to (1) the anchor arrangement and (2) a second retractor fixedly mounted below the second guide. The second retractor is mounted at or in proximity to the second side of the seat location. A second tongue is slidably connected to the belt between the second guide and the anchor arrangement for connection to the buckle. The second guide is mounted at or in proximity to the second side of the seat location at a second fixed height above the horizontal base of the seat location such that a relatively short occupant of the seat location is safely and comfortably restrained on the seat base at the seat location while the second tongue is connected to the buckle. The second belt, while in use with the second tongue in the buckle, includes (1) a first segment between the second retractor and the second guide, (2) a second segment between the second guide and the second tongue for restraining the shoulder and chest of the short occupant, and (3) a third segment between the second tongue and the anchor arrangement for restraining the lap of the short occupant. The second height is less than the first height.

Preferably, the anchor arrangement includes first and second anchors for the first and second vehicle occupant restraining systems respectively.

The seat can include plural seat locations, each including one of the seatbelt systems and the vehicle including the system can be a school bus, although the invention is not necessarily limited to school buses. In many school buses and cars, the seat preferably includes first, second and third seat locations, each including one of the seatbelt systems, in which case the first and third seat locations are at opposite first and second ends of the seat, and the second seat location is between the first and third seat locations.

Each seat location, at or in proximity to the second side thereof, preferably includes a passage in the seat through which the first segments of the first and second seatbelts extend in parallel spatial relationship to each other. The second and third segments of the first and second seatbelts extend in parallel spatial relationship to each other at or in proximity to the second side of the seat location while the first and second seatbelts are not in use. Such an arrangement minimizes tangling of the first and second seatbelts at each seat location.

In one preferred embodiment, the seat includes, at each seat location, a leg extending between the seat and a floor of the vehicle. The leg has (1) a rearwardly facing structure on which are mounted the first and second retractors respectively in substantial alignment with the first segments of the first and second seatbelts, and (2) a forwardly facing structure on which are mounted the first and second anchors respectively in substantial alignment with the second and third segments of the first and second seatbelts while the first and second seatbelts are not in use. This arrangement further minimizes tangling of the first and second seatbelts at each seat location.

Preferably, the first and second belts have differing indicia thereon for respectively indicating that the first vehicle occupant restraining system is for tall occupants and the second vehicle occupant restraining system is for short occupants. The differing indicia can include different colors for the first and second belts, an arrangement that is particularly advantageous for school bus use to cause very young children to use the correct belt.

The above and still further objects, features and advantages of the present invention will become apparent upon consideration of the following detailed description of a specific embodiment of thereof, especially taken in conjunction with the accompanying drawings.

DETAILED DESCRIPTION OF THE DRAWINGS

Figure 1:
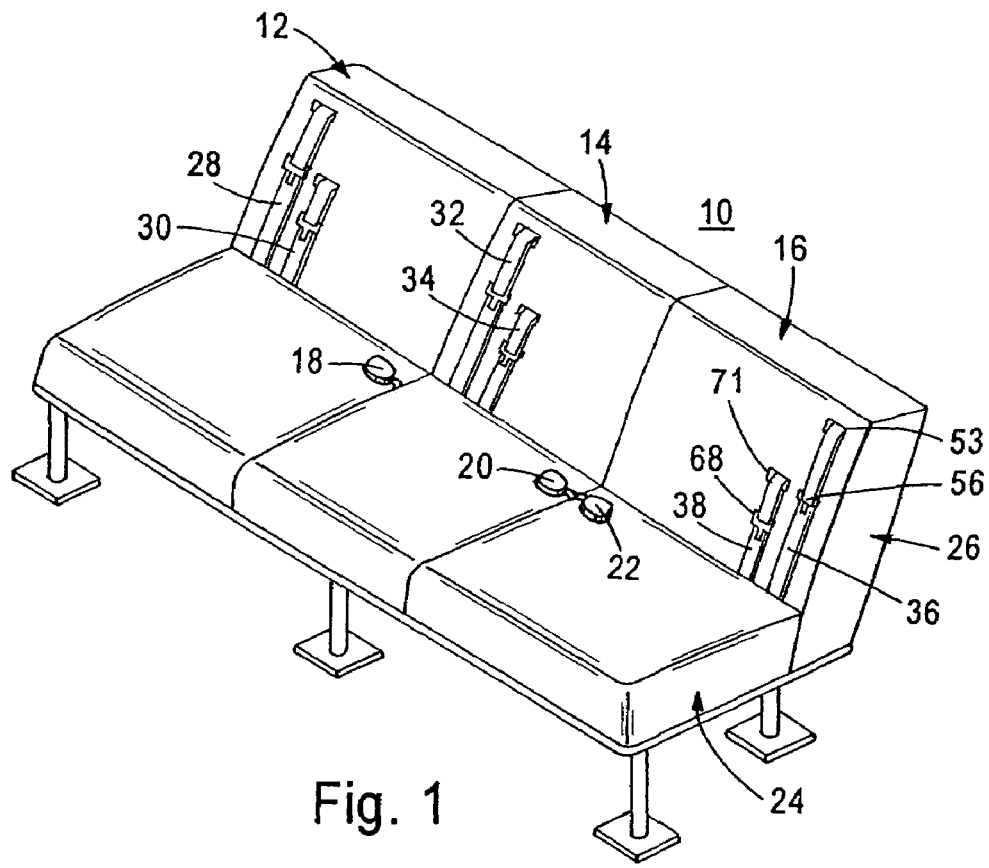
FIG. 1 is a perspective view of a school bus bench seat having three seat locations, each of which includes a pair of vehicle occupant restraining systems for different sized occupants, so that the restraining systems enable vehicle occupants of substantially different sizes to safely and comfortably occupy the single seat location at different times.

While the detailed description of the drawing deals with a school bus seat having three seat locations, it is to be understood that the invention is also applicable to a family vehicle having two or three seat locations and to school buses having only two seat locations per bench seat.

Figure 2:
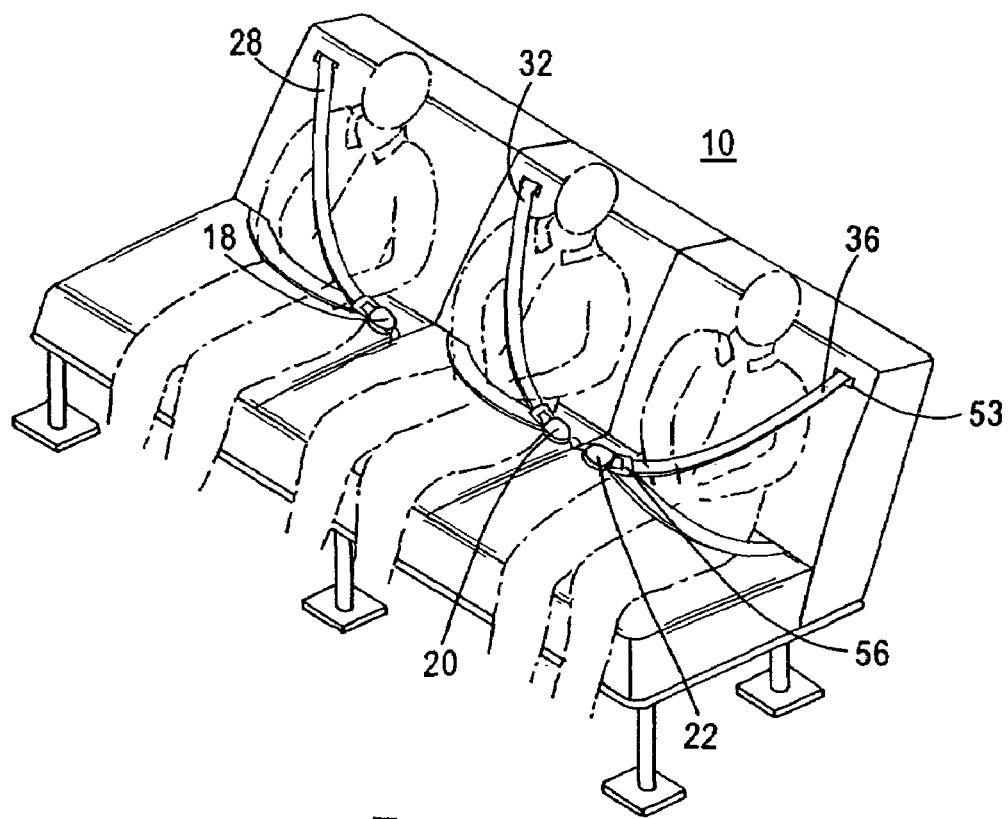
FIG. 2 is a perspective view of the seat illustrated in FIG. 1, wherein three adult sized occupants of the seat are shown as being confined by three seat belt systems of the type illustrated in FIG. 1.
Figure 3:
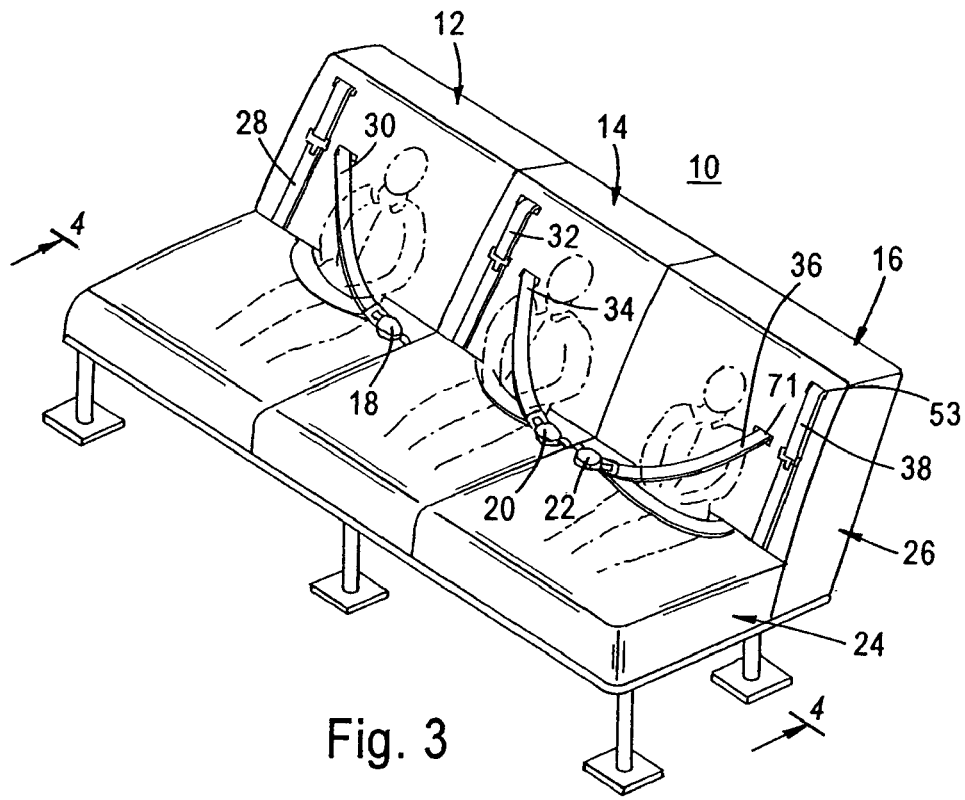
FIG. 3 is a perspective view of the seat of FIG. 1, wherein three small children are restrained by three, three point seat belt restraining systems, each having a guide at a height above the base of the seat that is suitable for small children.

Reference is now made to FIGS. 1-3 of the drawing wherein school bus bench seat 10 is illustrated as including left seat location 12, middle seat location 14 and right seat location 16, as illustrated in FIGS. 1-3. Each seat location 12, 14 and 16 includes two three point restraining systems for enabling the different sized occupants illustrated in FIGS. 2 and 3 to be safely and comfortably restrained at the seat location at different times. The three point restraining systems at locations 12 and 14 respectively include buckles 18 and 20 at the right side of the seat location, while the restraining system for seat location 16 includes buckle 22 at the left side of seat location 16. Buckles 18, 20 and 22 are typically located close to the intersection of seat base 24 and seat back 26, such that there is a single buckle at each seat location.

The three point restraining system at seat location 12 includes belts 28 and 30 that extend vertically parallel to each other when the belts are not in use, as illustrated in FIG. 1, such that long belt 28 is closer to the left edge of seat location 12 than short belt 30. Seat belts 32 and 34 at seat location 14 are positioned in the same manner at seat location 14 as belts 28 and 30 are positioned at seat location 12. Long seat belt 36 is positioned adjacent the right edge of seat location 16, while short seat belt 38 is positioned inwardly of seat belt 36 relative to the edge of seat location 16 that is close to belt 36. Seat belts 36 and 38, when not in use, extend vertically, parallel to each other.

Figure 4:
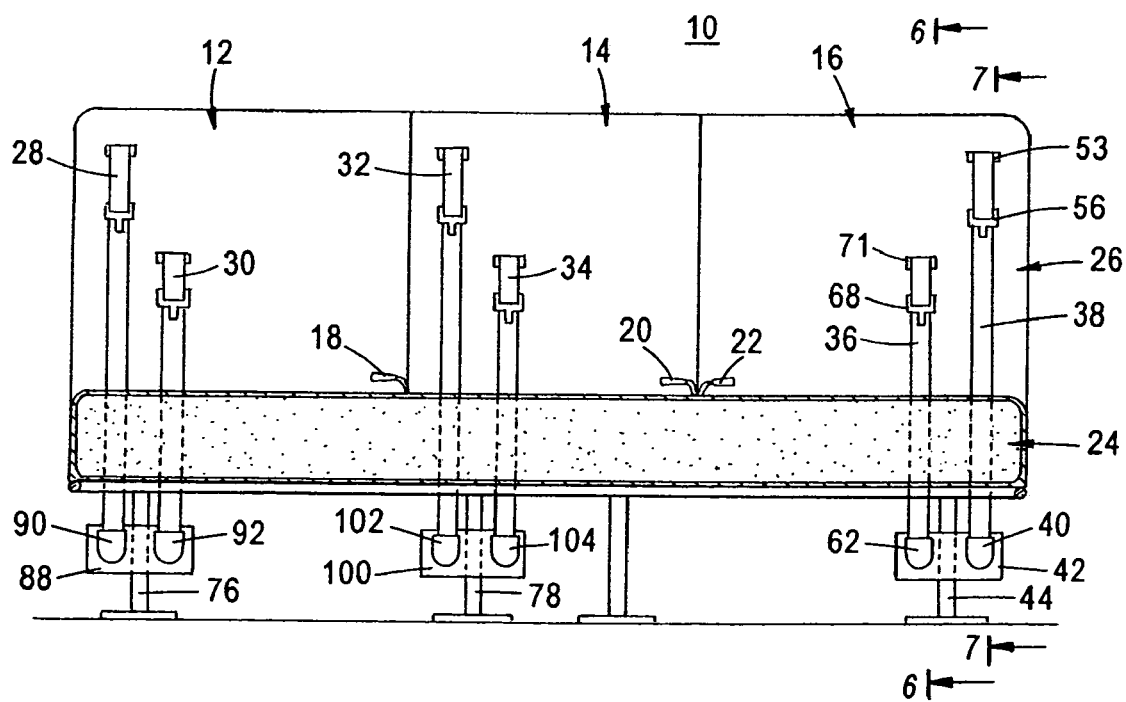
FIG. 4 is a front sectional view, taken through the lines 4-4, FIG. 1.

Because the seat belt systems associated with long seat belts 28, 32 and 36 are the same, except for the positions thereof at the seat location, the description of the long seat belts is confined to the description of seat belt 36. The seat belt system for seat belt 36 includes anchor 40, FIGS. 4 and 6, that is fixedly mounted on plate 42, on the front face of back leg 44 at seat location 16. The seat belt system including seat belt 36 also includes retractor 46, FIGS. 5 and 6, mounted on plate 48 on the back face of leg 44, close to the edge of seat location 16. Retractor 46 includes a conventional spring biased spool on which seat belt 36 is wound and from which the seat belt 36 is paid when in use. Retractor 46 includes the usual inertia activated brake and clutch arrangement to prevent movement of seat belt 36 when the seat belt is in use and a sudden stop of the vehicle in which the seat belt system is mounted occurs and to enable seat belt 36 to move freely under all other operating conditions of the vehicle.

First portion 50 of seat belt 36 extends from retractor 46 upwardly to idler roller 51, thence through slot 53. Roller 51 and slot 53 together function as a guide about which the seat belt 36 makes approximately a 180 degree turn. Seat belt portion 50 extends between retractor 46 and idler roller 51 through vertical, elongated slot 52 in back 26 at seat location 16. A second portion 54 of belt 36 extends downwardly from the guide formed by roller 51 and slot 53 to tongue 56 that is slidably mounted on the seat belt and, in use, is placed in buckle 22. A third portion 58 of seat belt 36 extends downwardly from tongue 56 through slot 60 between the front edge of seat back 26 and the rear face of base 24. Because idler roller 51 and slot 53 are located considerably above base 24, almost at the top of back 26 of seat location 16, seat belt 36 is suitable for use by adult or nearly adult sized occupants of seat location 16.

Figure 7:
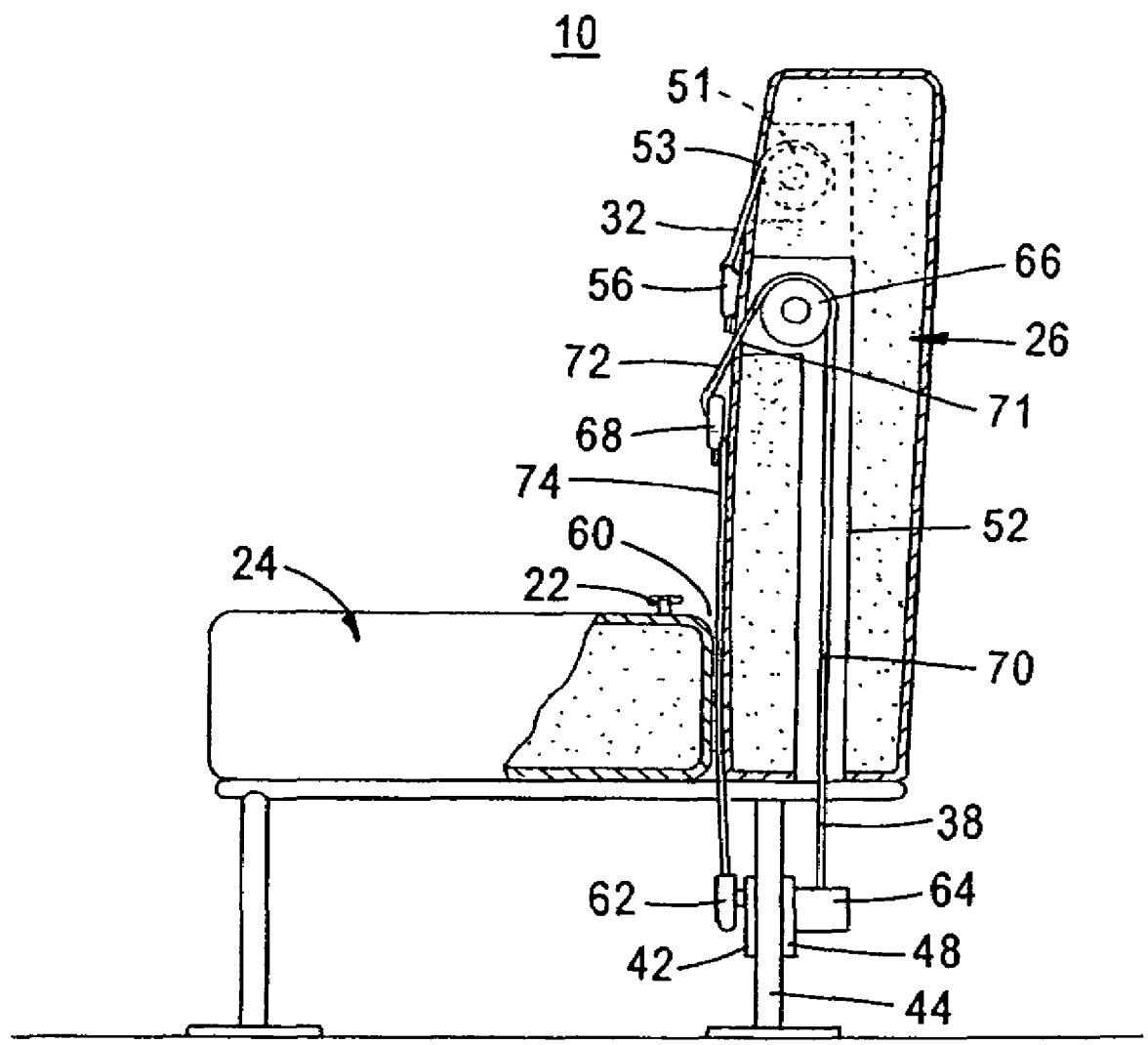
FIG. 7 is a side sectional view taken through the lines 7-7, FIG. 4.

Because the seat belt systems associated with short seat belts 30, 34 and 38 are the same, except for positions at the seat location, the description of the short seat belts is confined to the description for seat belt 38. The seat belt system for seat belt 38 includes anchor 62, FIGS. 4 and 7, that is fixedly mounted on plate 42, on the front face of back leg 44 at seat location 16. The seat belt system including seat belt 38 also includes retractor 64, FIGS. 5 and 7, mounted on plate 48 on the back face of leg 44. Retractor 64 is inside retractor 46 relative to the edge of seat location 16 that is close to belt 36. Retractor 64 includes a conventional spring biased spool on which seat belt 38 is wound and from which the seat belt 38 is paid when in use. Retractor 64 includes the usual inertia activated brake and clutch arrangement to prevent movement of seat belt 38 when the seat belt is in use and a sudden stop of the vehicle in which the seat belt system is mounted occurs and to enable seat belt 38 to move freely under all other operating conditions of the vehicle.

First portion 70 of seat belt 38 extends from retractor 64 upwardly to idler roller 66, thence through slot 71. Roller 66 and slot 71 together function as a guide about which seat belt 38 makes approximately a 180 degree turn. Seat belt portion 70 extends between retractor 64 and idler roller 66 through vertical, elongated slot 52 in back 26 at seat location 16. A second portion 72 of belt 38 extends downwardly from the guide formed by roller 66 and slot 71 to tongue 68 that is slidably mounted on the seat belt and, in use, is placed in buckle 22. A third portion 74 of seat belt 38 extends downwardly from tongue 68 through slot 60 between the front edge of seat back 26 and the rear face of base 24. Because idler roller 66 and slot 71 are located considerably below the guide formed by roller 51 and slot 53, about half way between the top face of base 24 and slot 53 (i.e., typically about 18 inches above the top face of seat 24), seat belt 38 is suitable for use by children of elementary school age, between five and ten years of age.

First portion 70 of seatbelt 38 extends upwardly, in a substantially straight line, from retractor 64 through slot 52 to idler roller 66 in substantially the same plane as first portion 50 of belt 36, but in a direction displaced inwardly of portion 50 relative to the edge of seat location 16 that is close to belt 36 so that portions 50 and 70 are substantially parallel to each other. Second portion 72 of belt 38, when not in use, extends vertically in substantially the same plane as portion 54 of seat belt 36 so that portions 54 and 72, when belts 36 and 38 are not in use, are substantially parallel to each other. Similarly, when belts 36 and 38 are not in use, portions 74 and 58 extend vertically, parallel to each other. Such an arrangement is advantageous to minimize tangling of belts 36 and 38. To more positively prevent tangling of belts 36 and 38, seat back 26 can include separate elongated slots through which seat belt portions 50 and 70 of seat belts 36 and 38 respectively pass.

The guide formed by roller 51 and slot 53 is at a height above base 24 such that adult sized or nearly adult sized occupants of seat location 16 who use belt 36 have the belt pass over the shoulders of the seat occupant, without the belt intersecting or being in front of the neck of the seat occupant. Similarly, the guide formed by roller 66 and slot 71 is positioned above seat 24 at a position such that occupants of seat location 16 between the ages of five and ten have the belt 38 pass over their shoulders, without contacting or being in front of their necks.

Figure 5:
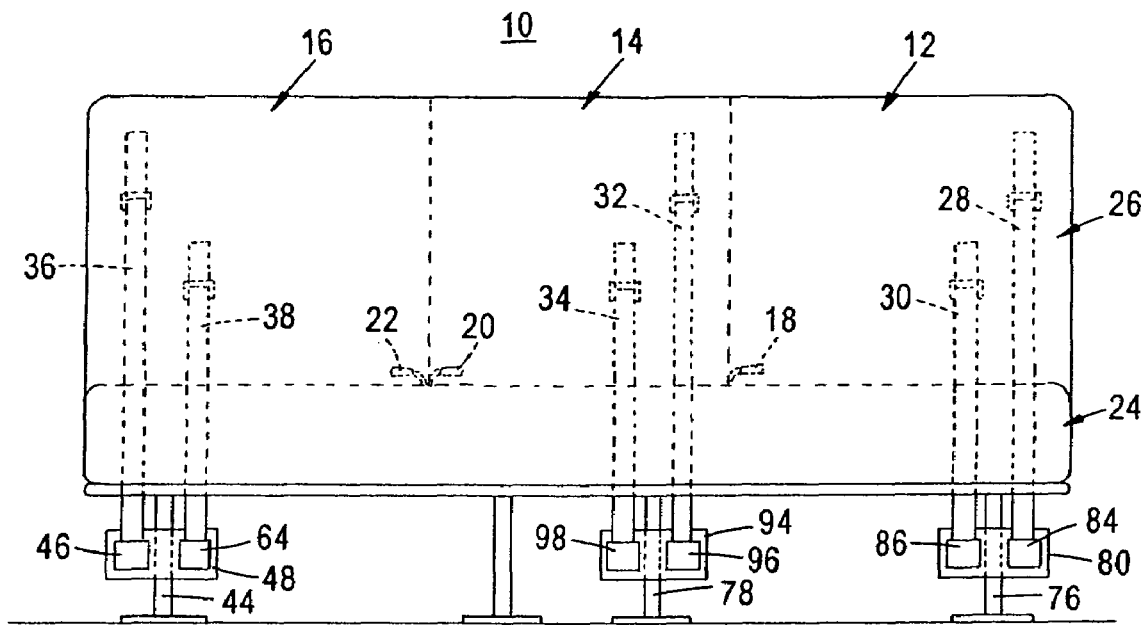
FIG. 5 is a back view of the seat illustrated FIG. 1.
Figure 6:
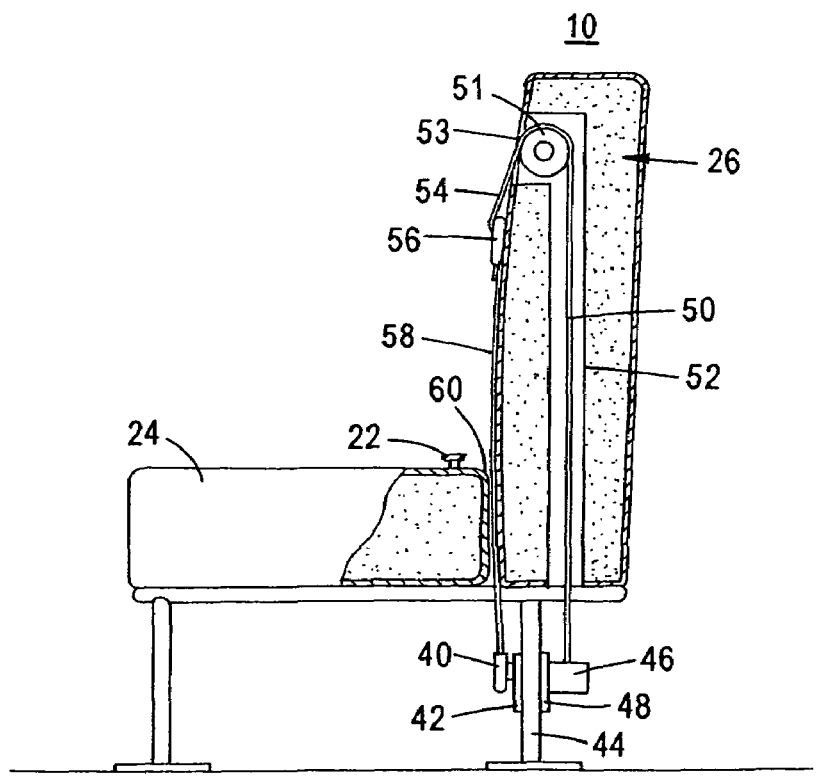
FIG. 6 is a side sectional view taken through the lines 6-6, FIG. 4.

As illustrated in FIG. 5, seat locations 12, 14 and 16 include rear legs 76, 78 and 44. Rear legs 76 and 78 are respectively located to the right sides of seat locations 12 and 14 (as illustrated in FIG. 5) and are arranged such that rear leg 44 is between belts 36 and 38, leg 76 is between seat belts 28 and 30, while rear leg 78 is between seat belts 32 and 34. Each of rear legs 76 and 78 carries a pair of plates that are mounted similarly to plates 42 and 48. Thus, plate 80, that carries retractors 84 and 86, respectively associated with belts 28 and 30, is on the rear face of rear leg 76, and plate, 88, (FIG. 4) that carries anchors 90 and 92 respectively associated with belts 28 and 30 is on the front face of leg 76, and plate 94 that carries retractors 96 and 98, respectively associated with belts 32 and 34, is on the rear face of rear leg 78 and plate 100 that carries anchors 102 and 104, respectively associated with belts 32 and 34 is on the front face of leg 78.

The large seat belts 28, 32 and 36 at seat locations 12, 14 and 16 have indicia different from indicia on small seat belts 30, 34 and 38 at these seat belt locations. The indicia are, typically, in the form of different colors, such that, for example, the large seat belts are green and the small seat belts are orange. Such an arrangement enables the large and small occupants of seat locations 12, 14 and 16 at different times to correctly select the appropriate seat belt. In addition, the different indicia enable the school bus operator to quickly determine if the individual occupying a particular seat belt location is employing the correctly sized seat belt for the individual.

In use, an adult or near adult sized occupant of seat location 16 tugs on belt tongue 56 and pulls belt 36 from retractor 46 until tongue 56 is inserted into buckle 22. Accordingly, the adult or near adult sized occupant of seat location 16 is restrained by belt 36, that crosses the shoulder and chest of such an occupant, without being in front of the neck or throat of such an occupant. Portion 58 of belt 36 between buckle 22 and slot 60 between the back face of seat base 24 at seat location 16 and the front face of the back 26 at seat location 16 bears against the waist of the adult or near adult sized occupant of seat location 16.

If, at a different time, seat location 16 is occupied by a small child or a child who is not of adult or near adult size, such a child tugs on tongue 68 of belt 38, to pull belt 38 from retractor 64 and inserts the tongue into buckle 22. This causes belt 38 to be paid from retractor 64 to traverse the shoulder and chest of such a small occupant of seat location 16, such that belt 38 does not pass in front of the throat or neck of the small occupant. This is because of the location of roller 66 and slot 71, about which and through which belt 38 extends, and the location of belt 38 and the apparatus associated therewith farther from the right edge of seat location 16 than belt 36.

While there has been described a single preferred embodiment of the invention, it is to be understood that variations in the details of the invention are possible and that it is to be understood that the scope of the invention is to be limited only by the appended claims.

The invention claimed is:

1. A seatbelt system for enabling vehicle occupants of substantially different sizes to occupy the same single seat location of a motorized vehicle, the seat location having a horizontal seat base on which the different sized vehicle occupants can sit at different times, the seatbelt system comprising:

a buckle mounted on a first side of the seat location;

a first vehicle occupant restraining system for the seat location including: a first belt; a first guide through which the first belt passes; the first belt having first and second ends respectively connected to (a) an anchor arrangement fixedly mounted below the first guide, and (b) a first retractor fixedly mounted below the first guide; the anchor arrangement and first retractor being mounted at or in proximity to the same, second side of the seat location that is opposite to the first side of the seat location; a first tongue slidably connected to the belt between the first guide and the anchor arrangement for connection to the buckle; the first guide being mounted at or in proximity to the second side of the seat location at a first fixed height above the horizontal base of the seat location such that a relatively tall occupant of the seat location is safely and comfortably restrained on the seat base at the seat location while the first tongue is connected to the buckle; the first belt, when in use with the first tongue in the buckle, including (a) a first segment between the first retractor and the first guide, (b) a second segment between the first guide and the first tongue for restraining the shoulder and chest of the tall occupant, and (c) a third segment between the first tongue and the anchor arrangement for restraining the lap of the tall occupant; and a second vehicle occupant restraining system for the seat location including: a second belt; a second guide through which the second belt passes; the second belt having first and second ends respectively connected to (a) the anchor arrangement and (b) a second retractor fixedly mounted below the second guide; the second retractor being mounted at or in proximity to the second side of the seat location; a second tongue slidably connected to the belt between the second guide and the anchor arrangement for connection to the buckle; the second guide being mounted at or in proximity to the second side of the seat location at a second fixed height above the horizontal base of the seat location such that a relatively short occupant of the seat location is safely and comfortably restrained on the seat base at the seat location while the second tongue is connected to the buckle; the second belt, when in use with the second tongue in the buckle, including (a) a first segment between the second retractor and the second guide, (b) a second segment between the second guide and the second tongue for restraining the shoulder and chest of the short occupant, and (c) a third segment between the second tongue and the anchor arrangement for restraining the lap of the short occupant; the second height being less than the first height.

2. The system of claim 1 wherein the anchor arrangement includes first and second anchors for the first and second vehicle occupant restraining systems respectively.

3. The system of claim 1 wherein the seat includes plural seat locations, each including one of the seatbelt systems.

4. The system of claim 1 wherein the vehicle is a school bus.

5. The system of claim 1 wherein the seat includes first, second and third seat locations, each including one of the seatbelt systems, the first and third seat locations being at opposite first and second ends of the seat, the second seat location being between the first and third seat locations.

6. The system of claim 5 wherein each seat location, at or in proximity to the second side thereof, includes a passage in the seat through which the first segments of the first and second seatbelts extend in parallel spatial relationship to each other; the second and third segments of the first and second seatbelts extend in parallel spatial relationship to each other at or in proximity to the second side of the seat location while the first and second seatbelts are not in use.

7. The system of claim 6 wherein the anchor arrangement for each seat location includes a first anchor for the first restraining system and a second anchor for the second restraining system; the seat including, at each seat location, a leg extending between the seat and a floor of the vehicle, the leg having (a) a rearwardly facing structure on which are mounted the first and second retractors respectively in substantial alignment with the first segments of the first and second seatbelts and (b) a forwardly facing structure on which are mounted the first and second anchors respectively in substantial alignment with the second and third segments of the first and second seatbelts while the first and second seatbelts are not in use.

8. The system of claim 1 wherein the seat includes plural seat locations, each including one of the seatbelt systems.

9. The seatbelt system of claim 8 wherein the first and second belts at each seat position have differing indicia thereon for respectively indicating that the first vehicle occupant restraining system is for tall occupants and the second vehicle occupant restraining system is for short occupants.

10. The seatbelt system of claim 9 wherein the differing indicia include different colors for the first and second belts.

11. The system of claim 8 wherein each seat location, at or in proximity to the second side thereof, includes a passage in the seat through which the first segments of the first and second seatbelts extend in parallel spatial relationship to each other; the second and third segments of the first and second seatbelts extend in parallel spatial relationship to each other at or in proximity to the second side of the seat location while the first and second seatbelts are not in use.

12. The system of claim 11 wherein the anchor arrangement, at each seat location, includes a first anchor for the first restraining system and a second anchor for the second restraining system; the seat including, at each seat location, a leg extending between the seat and a floor of the vehicle, the leg having (a) a rearwardly facing structure on which are mounted the first and second retractors respectively in substantial alignment with the first segments of the first and second seatbelts and (b) a forwardly facing structure on which are mounted the first and second anchors respectively in substantial alignment with the second and third segments of the first and second seatbelts while the first and second seatbelts are not in use.

13. The system of claim 1 wherein the seat location, at or in proximity to the second side thereof, includes a passage in the seat through which the first segments of the first and second seatbelts extend in parallel spatial relationship to each other; the second and third segments of the first and second seatbelts extend in parallel spatial relationship to each other at or in proximity to the second side of the seat location while the first and second seatbelts are not in use.

14. The system of claim 13 wherein the anchor arrangement includes a first anchor for the first restraining system and a second anchor for the second restraining system; the seat including, at each seat location, a leg extending between the seat and a floor of the vehicle, the leg having (a) a rearwardly facing structure on which are mounted the first and second retractors respectively in substantial alignment with the first segments of the first and second seatbelts and (b) a forwardly facing structure on which are mounted the first and second anchors respectively in substantial alignment with the second and third segments of the first and second seatbelts while the first and second seatbelts are not in use.

15. The seatbelt system of claim 1 wherein the first and second belts have differing indicia thereon for respectively indicating that the first vehicle occupant restraining system is for tall occupants and the second vehicle occupant restraining system is for short occupants.

16. The seatbelt system of claim 15 wherein the differing indicia include different colors for the first and second belts.

17. A seatbelt system for enabling substantially different sized vehicle occupants to occupy the same seat location having a horizontal base on which the different occupants can sit, the seatbelt system comprising: first and second 3-point restraining systems for enabling the different sized occupants to be safely and comfortably restrained at the seat location at different times respectively including first and second belt guides at first and second different fixed heights above the horizontal base.

* * * * *